May 26, 1964     H. HARDY     3,134,141
INJECTION MOLDING APPARATUS
Filed Oct. 27, 1961
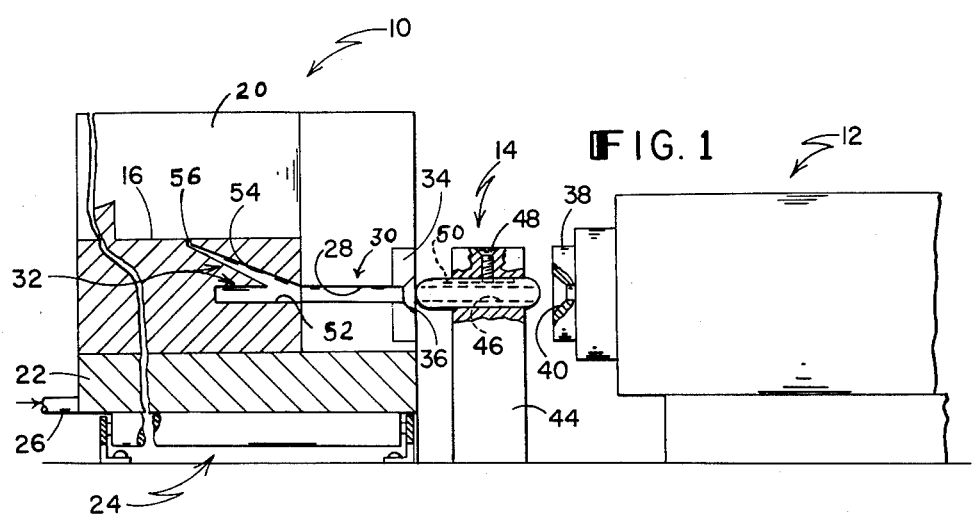
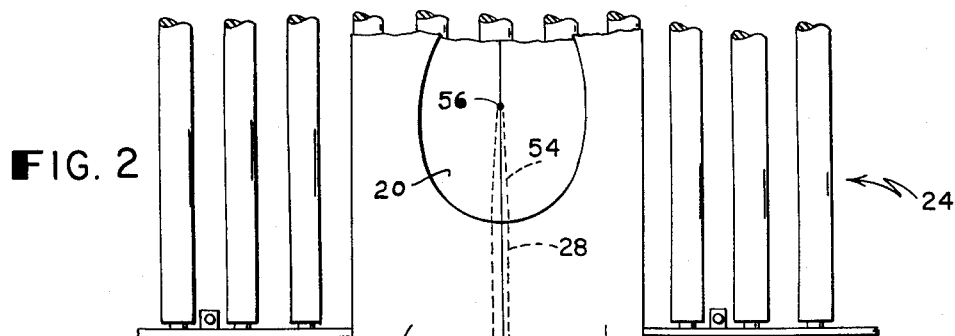
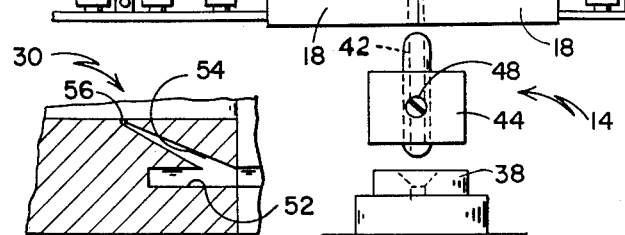
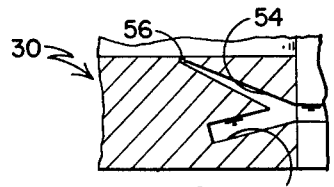
INVENTOR.
HENRY HARDY
BY Roberts, Cushman & Grover
ATT'YS.

United States Patent Office 3,134,141
Patented May 26, 1964

3,134,141
INJECTION MOLDING APPARATUS
Henry Hardy, Cambridge, Mass., assignor to International Vulcanizing Corporation, Boston, Mass., a corporation of Massachusetts
Filed Oct. 27, 1961, Ser. No. 148,192
1 Claim. (Cl. 18—30)

This invention relates to apparatus for use in the manufacture of footwear and more particularly to injection molding apparatus for forming and attaching bottoms to lasted upper assemblies.

In accordance with current practice, a lasted upper assembly is held against the open top of a bottom-forming mold and a plasticized bottom-forming composition is injected by an injector into the mold cavity beneath the upper assembly through an injection opening in the lower part of the mold. The mold is usually mounted so as to be movable into alignment with the injector and to bring the injection nozzle of the injector into engagement with the injection opening in the mold or, as shown in my pending application Serial No. 87,364, filed February 6, 1961, a nipple fixed to the mold into engagement with the discharge opening of the injector. The nipple in the aforesaid application is split so as to be separable with the halves of the mold and has the advantage, by reason of this construction, of making it easy to remove the sprue of plastic following injection and of minimizing the amount of residue at the discharge opening of the injector. The two-part nipple however requires careful machining and fitting to the mold halves. Moreover, careless use will result in misalignment of the parts and thus leakage. It is accordingly the principal object of this invention to provide improved means for conducting the plastic from the injector to the mold which does not require precision manufacture; which can withstand continuous, hard and even careless usage without failure, or imperfect functioning; which facilitates removal of the sprue from the mold; and which leaves no excessive residue at the discharge opening of the injector.

As herein illustrated, the means comprises a transfer tube supported between the mold and the injector with its ends in alignment with the openings in the mold and injector for axial movement relative to the mold and injector. The tube is slidable on its support, is shorter than the distance between them and is movable, by movement of the mold into engagement with one end, to a position in which its opposite end is engaged with the discharge opening of the injector. The openings are chamfered and the ends of the tube are rounded to fit closely within the openings.

In spite of the fact that the foregoing structure minimizes the amount of residue at the discharge opening a "cold plug" is formed following each injection which is pushed into the injection opening in the mold in the succeeding operation. The "cold plug" if actually forced into the mold forms scar tissue which detracts from the appearance of the finished article and also tends to interfere with injection. It is accordingly another object of the invention to provide means for rendering the residue "cold plug" innocuous.

In accordance with this aspect of the invention the bottom is provided with an injection opening, which enters the mold bottom below the surface constituting the bottom of the mold cavity, which has a blind end passage extending inwardly from the entrance end and a bypass passage extending from the blind end passage into the mold cavity which, respectively, receive the "cold plug" and allow the following liquid plastic to flow freely into the mold cavity.

In previous molds the injection opening entered the bottom surface of the mold cavity close to the heel end and as the plastic flowed into the cavity produced flow lines as successive layers cooled and overran previous layers. It is accordingly a further object of the invention to eliminate such flow lines and this is effected by arranging the injection opening at substantially the center of the heel end of the mold cavity so that the injected composition mushrooms laterally in all directions rather than in one direction in successive layers.

The invention will now be described in greater detail with reference to the accompanying drawings wherein:

FIG. 1 is an elevation, partly in section, showing the injection mold, the injector and the transfer tube;

FIG. 2 is a plan view;

FIG. 3 is an enlarged vertical section taken transversely of the bottom part of the mold showing the preferred form of the injection opening; and FIG. 4 is a fragmentary vertical section corresponding to FIG. 3, showing an alternative form of injection opening.

Referring to the drawings, the injection apparatus comprises a mold 10, an injector 12 and transfer means 14 for transferring the molding composition from the injector to the mold.

The mold 10 is of the kind having a bottom 16 and side walls 18 arranged to be moved into engagement with the bottom to form an open top mold cavity 20 into which the molding composition may be injected through the bottom, beneath an upper assembly held against the open top and to be separated to permit removing the finished article. The bottom and side walls 16 and 18 are supported by a bed plate 22 which, in turn, may rest upon a roller-type conveyor 24 for movement into alignment with the injector and thereafter for movement toward the injector, for example, by means of a fluid-actuated ram 26.

The bottom-forming composition is injected into the mold cavity through an injection opening 28 formed by semi-circular grooves 30 at the interfaces of the side walls at one end of the mold, and an injection passage 32 formed in the bottom 16. Ware plates 34 are set into the end portions of the side walls over the injection opening 30 and are provided with chamfered semi-circular openings 36 which collectively register with the opening 30.

The injector 12 is of a conventional type, being provided with a discharge nozzle 38 having a discharge opening 40 through which the bottom-forming composition is forced in liquid form, for example, by means of a sprue. The discharge opening 40 is chamfered as is the opening in the plate 34.

The transfer means 14 comprises a tube 42 mounted on a support 44 at the level of the openings 36 and 40 and has an axial passage 46 through it for conducting the bottom-forming composition from the injector to the mold. The tube 42 is shorter than the distance between the injector and mold when the mold occupies its normally retracted position and is slidably mounted in its support so that when the ram 26 moves the mold toward the injector the tube is first engaged by the plate 34 in the mold and then forced toward the injector into engagement with the opening 40. The ends of the tube are rounded and provide, when engaged with the chamfered openings 36 and 40, a substantially liquid-tight seal so that the bottom-forming composition does not escape under the injection pressure.

Axial movement of the tube is limited by a screw or the like 48 set into the support with an end extending into a slot 50 in the surface of the tube intermediate its ends.

As thus constructed, following injection, when the mold is retracted the transfer tube is pulled away from the discharge opening of the injector by the sprue, leaving a minimum residue at the discharge opening. Since the transfer tube has a straight passage through it, when the side walls of the mold are separated, the sprue can be easily pulled out of the transfer tube.

In spite of the fact that a minimum residue is left at the discharge opening of the injector, this residue forms a "cold plug" which, if forced through the transfer tube and injection opening into the mold at the succeeding operation, forms scar tissue in the bottom of the shoe which is undesirable. In order to eliminate this defection the injection opening 30 in the bottom 16 is provided with a straight portion 52 corresponding in diameter to the diameter of the discharge opening 40 which terminates in a blind end and is of a length substantially equal to the length of the residue left at the discharge opening, that is, to the length of the "cold plug," and with a tapering bypass 54 which extends from near the entrance end of the passage 52 upwardly through the bottom into the mold cavity, providing a small diameter opening 56 through which the liquid bottom-forming composition, following the "cold plug," flows into the mold cavity. The blind end passage 52 receives and traps the "cold plug" forced ahead of the liquid composition following it, whereupon the liquid composition flows through the bypass 54 into the mold cavity. Preferably the blind end passage is slightly longer than the "cold plug" so as to insure free flow of the liquid compound through the bypass. The blind end passage 52 may, if desired, be sloped downwardly at a slight angle as shown in FIG. 4. As thus constructed, when the mold halves are separated and the sprue pulled free of the transfer tube the "cold plug," situated in the blind end passage 52 and the sprue in the tapering bypass passage 54, may be easily pulled out of the bottom and discarded.

Heretofore, the entrance opening 56 into the mold cavity has been located close to the heel end of the bottom and, as a result, the injected molding composition piled up in layers wihch produced unidirectional flow lines along the sides of the heel. Such flow lines are objectionable and hence the opening 56, as shown herein, is disposed substantially at the center of the heel so that the bottom-forming composition piles up and mushrooms in all directions toward the sides and back of the heel without the formation of any definite or distinct flow lines.

It should be understood that the present disclosure is for the purpose of illustration only and that this invention includes all modifications and equivalents falling within the scope of the appended claims.

I claim:

Apparatus of the kind for molding shoe bottoms to uppers and in which there is an injector having an injection orifice and an injection mold containing a mold cavity, said mold comprising a one-piece bottom part having a peripheral contour corresponding to the bottom to be formed onto the upper, a top face corresponding to the tread surface of the bottom to be formed and containing at the heel end, entering the peripheral edge at the back line of the heel on the longitudinal center line, a forked injection passage which extends forwardly toward the toe, comprising a horizontal portion of uniform cylindrical cross-section terminating in a blind end and constituting a pocket, and an upwardly diverging tapering portion terminating in the top face of the bottom part within the area of the heel substantially at the center thereof; and a pair of walls including side and end parts mating at the ends along the longitudinal center line of the bottom part and having in the mating faces at the heel end semi-cylindrical grooves which collectively form a passage corresponding in diameter to the horizontal portion of the pasage in the bottom part through which the bottom-forming composition may be injected into the passage in the bottom part and into the mold cavity formed by the bottom part and side and end parts, said walls providing, when separated from each other after a bottom-attaching operation, access to a length of sprue exteriorly of the bottom part by means of which the sprue within the forked pasage in the bottom part may be extracted by pulling it from said bottom part, and said pocket constituting a well for receiving and bypassing the cold plug at the commencement of each injection operation to prevent the cold plug from entering the mold cavity.

References Cited in the file of this patent

UNITED STATES PATENTS

| | | |
|---|---|---|
| 2,470,089 | Booth | May 17, 1949 |
| 2,524,858 | Thomas | Oct. 10, 1950 |
| 2,687,554 | Root | Aug. 21, 1954 |
| 2,857,581 | Henning | Oct. 21, 1958 |
| 2,871,517 | Allard | Feb. 2, 1959 |
| 2,903,747 | Wucher | Sept. 15, 1959 |
| 2,994,920 | Patera | Aug. 8, 1961 |
| 3,014,242 | Baker et al. | Dec. 26, 1961 |